(12) United States Patent
Urban et al.

(10) Patent No.: US 6,915,757 B2
(45) Date of Patent: Jul. 12, 2005

(54) SAFETY DEVICE HAVING A TELESCOPIC STANDARD

(75) Inventors: Blake R. Urban, Lenior, NC (US); Issac D. M. White, Orlando, FL (US); James E. Dickens, Ocoee, FL (US); Kevin Forsberg, Orlando, FL (US); Charles Sawyer, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 77 days.

(21) Appl. No.: 10/330,461

(22) Filed: Dec. 28, 2002

(65) Prior Publication Data

US 2004/0123792 A1 Jul. 1, 2004

(51) Int. Cl.[7] .............................. G09F 17/00; G09F 7/20
(52) U.S. Cl. ....................... 116/173; 116/28 R; 40/600; 248/289.11
(58) Field of Search .............................. 116/35 R, 28 R, 116/63 P, 63 R, 173; 40/591, 600, 492, 389, 390, 398, 400, 402, 403; 248/206.5, 683, 291.1, 292.12, 289.11, 297.31, 473; D20/21; D10/109

(56) References Cited

U.S. PATENT DOCUMENTS

| | | | | |
|---|---|---|---|---|
| 1,932,143 A | * | 10/1933 | Piercy ......................... 362/398 |
| 2,072,573 A | * | 3/1937 | Vigliotti ..................... 116/173 |
| 2,460,593 A | * | 2/1949 | Nelson .................. 248/289.11 |
| 2,471,342 A | * | 5/1949 | Nelson .................. 248/289.11 |
| 3,220,132 A | * | 11/1965 | Swige et al. ................... 40/711 |
| 3,507,245 A | * | 4/1970 | Grabow ..................... 116/28 R |
| 3,572,305 A | | 3/1971 | Moragne |
| 3,788,268 A | * | 1/1974 | Hiatt et al. ................ 116/28 R |
| 4,028,827 A | | 6/1977 | Hufton |
| 4,077,597 A | * | 3/1978 | Greig ......................... 248/477 |
| 4,335,862 A | * | 6/1982 | Sherman ................ 248/289.11 |
| 4,339,223 A | | 7/1982 | Golze |
| D296,087 S | * | 6/1988 | Luck ......................... D10/114 |
| 4,825,192 A | * | 4/1989 | Wells ......................... 340/433 |
| 4,888,893 A | * | 12/1989 | Jones ......................... 40/592 |
| 4,976,455 A | * | 12/1990 | Brammer et al. ........... 280/762 |
| 5,078,281 A | * | 1/1992 | Johnson ................... 211/88.01 |
| 5,140,933 A | * | 8/1992 | Nishina et al. ............. 116/209 |
| 5,249,381 A | * | 10/1993 | Panossian .................... 40/591 |
| 5,355,117 A | * | 10/1994 | Jefferson ................. 340/425.5 |
| 5,388,546 A | | 2/1995 | Lombard |
| 5,419,065 A | | 5/1995 | Lin |
| 5,609,121 A | | 3/1997 | Gross |
| 5,699,631 A | * | 12/1997 | Tyson ......................... 40/621 |
| 6,041,717 A | * | 3/2000 | Kubat ......................... 108/44 |
| 6,138,394 A | | 10/2000 | Sulenski |
| 6,213,047 B1 | * | 4/2001 | Means et al. ............. 116/28 R |
| 2004/0134108 A1 | * | 7/2004 | Harari ......................... 40/600 |

\* cited by examiner

*Primary Examiner*—R Alexander Smith
(74) *Attorney, Agent, or Firm*—Walters & Zimmerman; Geoff Sutcliffe; Todd Mitchem (57) ABSTRACT

A safety device is disclosed for cautioning passing motorists or pedestrians to the presence of a vehicle. One embodiment has a mount and a rigid standard affixed to the mount. The standard is extensible in length. The standard has at least a first section moving in relation to a second section to extend the length of the standard. Another embodiment of the standard telescopes in length to enhance visibility. This embodiment of the standard has a tubular cross-section and an inner section sliding within an outer section. The safety device attaches to the vehicle and cautions passing motorists or pedestrians.

3 Claims, 6 Drawing Sheets

SAFETY DEVICE HAVING A TELESCOPIC STANDARD

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to signs and, more particularly, to a sign carried by an automotive vehicle.

2. Description of the Related Art

Safety devices are often used to control or to direct traffic. These safety devices, such as brightly colored (e.g., orange) cones, flags, and barrels, alert passing motorists and pedestrians to be aware of approaching conditions. These safety devices are deployed to direct traffic around an accident scene, a disabled vehicle, or a construction site. These safety devices, for example, are frequently deployed by utility repair crews. When a telecommunications technician, or other technician, must perform a repair, the technician deploys the safety devices. The technician positions bright orange safety cones, and other safety devices, around the perimeter of the repair vehicle and of the work site. These safety devices alert passing motorists and pedestrians to the presence of the stationary repair vehicle, and these safety devices alert passing motorists and pedestrians to be aware when in the vicinity of the repair vehicle.

These existing safety devices, however, are expensive to replace. Because these safety devices are placed in the vicinity of passing motorists, the bright orange cones and barrels are often hit by passing vehicles. When a passing vehicle impacts the safety device, the damage is often significant and the safety device must be replaced. The safety devices are also frequently forgotten and repair crews drive off without stowing the cones, etc. The safety devices are also frequently stolen, further adding to the problem of replacement. The cost of replacing these damaged, lost, and stolen safety devices has proven to be a wasteful expense. There is, accordingly, a need in the art for a safety device that is less susceptible to damage from passing motorists, that is not easily forgotten at the job site, and that is less expensive to replace.

BRIEF SUMMARY OF THE INVENTION

This invention is a safety device. This safety device has a brightly-colored banner, pennant, flag, or, in general, a standard extending from a mount. The standard alerts a person to be aware while in the vicinity of the standard. This invention is smaller than conventional bright orange cones, and thus this invention is easily stowed. This invention, in fact, is preferably narrow enough to stow within the door or seat pocket of a vehicle. This invention also quickly and easily mounts to many surfaces, such as a door frame, window sill, or vehicle side window. This invention may even include a magnetic mount that quickly attaches to metallic surfaces, such as a vehicle's door skin, fender, roof, or side. Because this safety device may be quickly mounted at a variety of points on the vehicle, this invention can be placed at the eye level of approaching motorists, thus improving visibility of the standard and providing an enlarged zone of caution. Should, however, the standard of this invention be struck by a passing motorist, this invention includes a feature that allows the standard to fold or pivot on impact, thus reducing damage to the standard. All these features reduce the need to replace the safety device, and thus reduce the replacement costs.

One embodiment of this invention describes a safety device. This safety device comprises a mount and a rigid standard extending from the mount. The term "standard" means a flag, banner, pennant, or other like ensign. The standard is extensible in length, and the standard comprises at least a first section moving in relation to a second section to extend the length of the standard. The standard alerts a person to be aware while in the vicinity of the standard. Although the preferable embodiment of this invention is a safety device, the standard may also comprise words, numbers, logos, etc. The standard, for example, may have "CAUTION" produced on a surface of the standard. The surface of the standard, however, could also be produced with a logo or trademark to signify support or loyalty for a group, such as a sporting team.

Another embodiment also describes a safety device. This embodiment comprises a mount and a rigid standard extending from the mount. Here, however, the standard comprises a tubular cross-section. This telescopic feature of the standard has an inner section sliding within an outer section. The standard telescopes in length (similar to a telescopic antenna) to enhance visibility.

Still another embodiment of this invention also describes a safety device. This embodiment comprises a rigid standard extending from, and pivoting about, a magnetic mount. The mount comprises a generally "C"-shaped bracket having an upper support member spaced from a lower support member. The upper support member has an elongate shape defining an upper longitudinal axis, and the lower support member also has an elongate shape defining a lower longitudinal axis. The upper support member and the lower support member each extend from an body portion of the mount. The upper support member and the lower support member each have an aperture at a distal end thereof, and the mount also comprises a permanent magnet. The standard has an upper pin and a lower pin at a common end of the standard. The upper pin and the lower pin are each aligned along a pivot axis. The upper pin inserts into the aperture in the upper support member, while the lower pin inserts into the aperture in the lower support member. The upper pin and the lower pin each rotate within their respective apertures to allow the standard to pivot about the pivot axis. The lower support member also comprises a first channel, a second channel, and a third channel. The first channel is approximately perpendicularly oriented to the lower longitudinal axis and radially extends from an outer edge of the aperture to an outer edge of the distal end. The second channel is approximately oriented along the longitudinal axis and radially extends from the outer edge of the aperture to the outer edge of the distal end. The third channel is oriented between the first channel and the second channel and radially extends from the outer edge of the aperture to the outer edge of the distal end. The first, second, and third channels each have a width sized to accept a thickness of the standard, and the first, second, and third channels each have a depth sufficient to retain a portion of the standard within the channel. As the standard pivots about the pivot axis, the standard falls into either the first, second, or third channel, thus orienting the standard along the respective channel.

The safety device of this invention may have various mounts. The invention may have a mount designed to slip onto, or hook over, a door frame, a window sill, or a window sash. The safety device could also have a mount designed to slip onto a vehicle's door, bumper, mirror, or window. The mount of this invention could also include a permanent magnet, allowing the safety device to magnetically attach to metallic surfaces.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
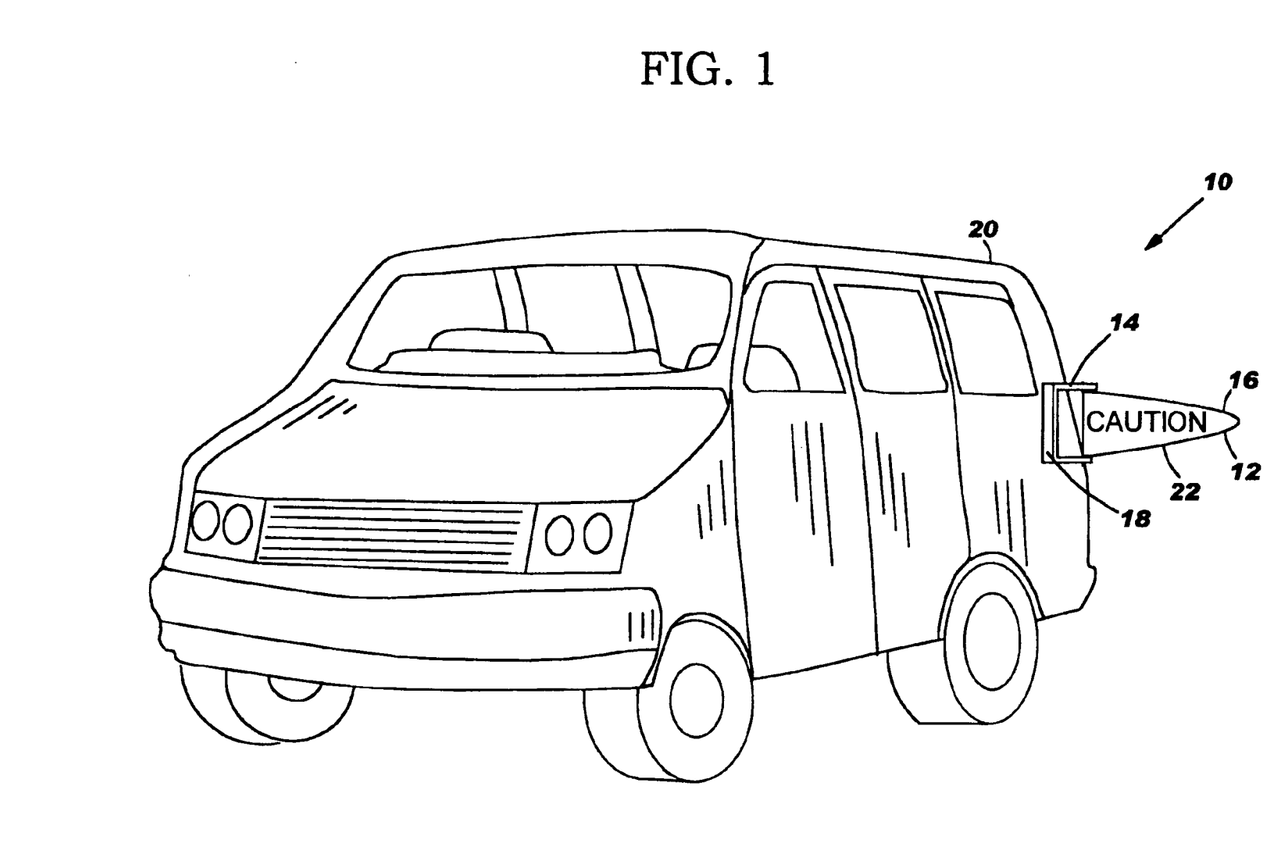
FIG. 1 is an isometric drawing of a safety device according to this invention.

FIG. 1 is an isometric drawing of a safety device 10 according to this invention. The safety device 10 comprises a rigid standard 12 extending from a mount 14. FIG. 1 shows the standard 12 resembling a pennant 16, although the standard 12 may have any shape. The mount 14 preferably includes a permanent magnet 18, and the permanent magnet 18 allows the mount 14 to be attached to any magnetizable surface (such as a vehicle 20). The standard 12 preferably has a highly-visible surface color 22 (such as bright orange, bright yellow, etc.), and the standard 12 alerts a person to be aware while in the vicinity of the standard 12. When the mount 14 is magnetically attached to the vehicle 20, the standard 12 alerts an approaching motorist, or pedestrian, to be aware while in the vicinity of the vehicle 20.

Figure 2:
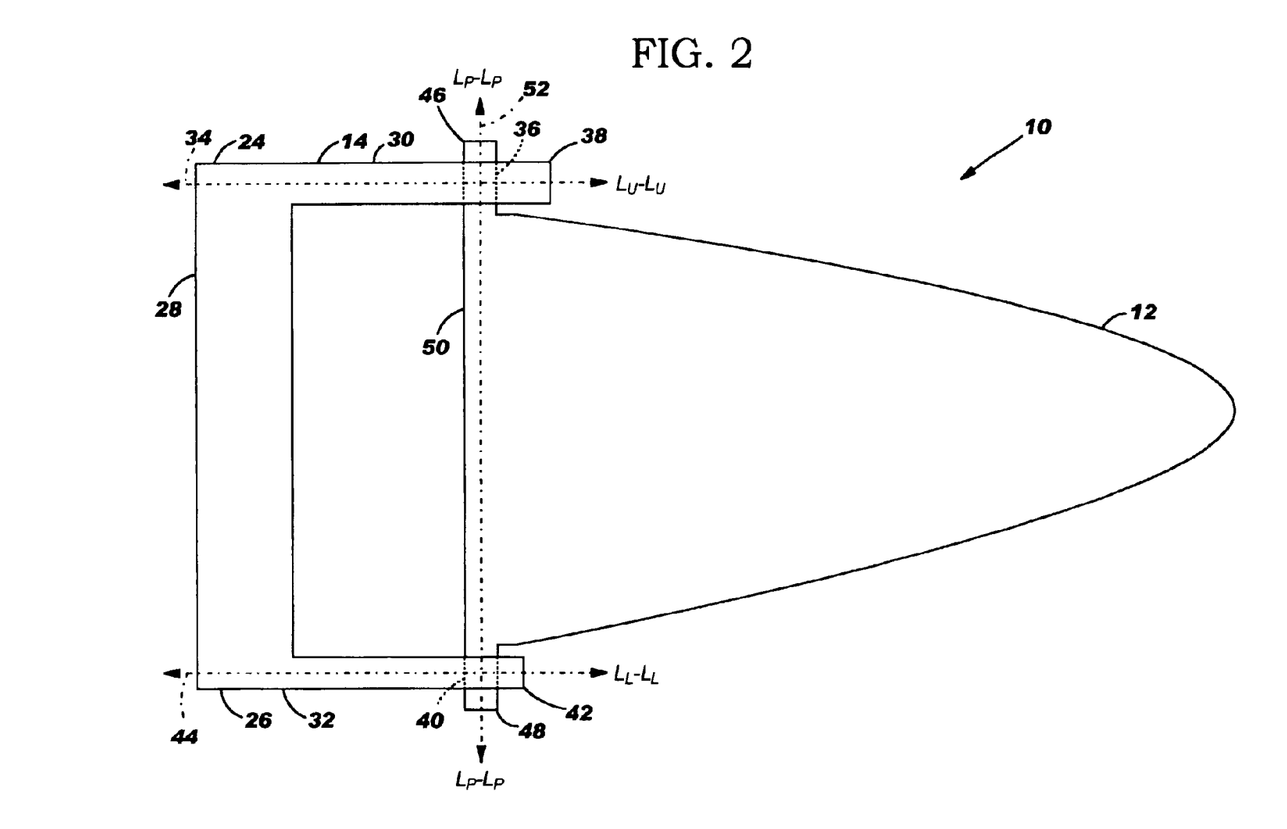
FIGS. 2, 3, and 4 are schematics showing additional details of the safety device shown in FIG. 1.
Figure 3:
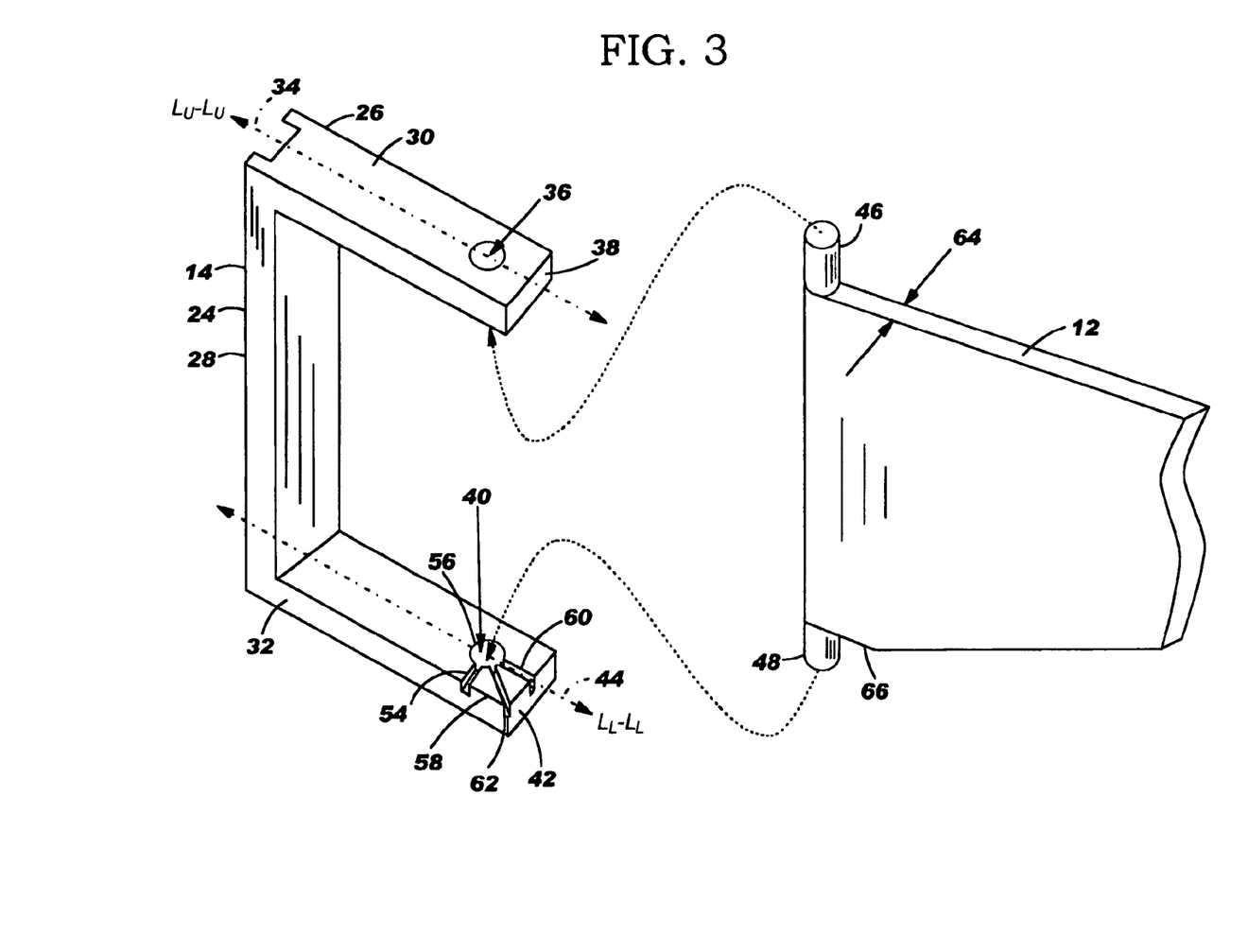

FIGS. 2 and 3 are schematics showing additional details of the safety device 10 shown in FIG. 1. FIG. 2 is an orthographic view of the safety device 10, while FIG. 3 is a partial, enlarged view of a portion of the safety device 10. Although the mount 14 resembles a generally "C"-shaped bracket 24, the mount 14 may have any shape to suit the application. The bracket 24 has at least one support member 26 extending from a body 28. An upper support member 30 and a lower support member 32, for example, cantilever from the body 28. The upper support member 30 has an elongate shape defining an upper longitudinal axis $L_U$—$L_U$ (shown as reference numeral 34). The upper support member 30 has a hole, or an aperture 36, approximate a distal end 38. The aperture 36 is preferably aligned along the upper longitudinal axis $L_U$—$L_U$. The lower support member 32, likewise, has an aperture 40 approximate a distal end 42, and the aperture 40 is preferably aligned along a lower longitudinal axis $L_L$—$L_L$ (shown as reference numeral 44). The standard 12 has an upper pin 46 and a lower pin 48 at a common end 50 of the standard 12. The upper pin 46 and the lower pin 48 are preferably aligned along a pivot axis $L_P$—$L_P$ (shown as reference numeral 52). The upper pin 46 inserts up into the aperture 36 in the upper support member 30, while the lower pin 48 inserts down into the aperture 40 in the lower support member 32. The upper pin 46 and the lower pin 48 each rotate within their respective apertures 36, 40, thus acting as trunnions to allow the standard 12 to pivot about the pivot axis $L_P$—$L_P$.

As FIG. 3 best shows, the lower support member 32 includes at least one channel. A first channel 54, for example, is approximately perpendicularly oriented to the longitudinal axis $L_L$—$L_L$ and radially extends from an outer edge 56 of the aperture 40 to an outer edge 58 of the distal end 42. A second channel 60 is approximately oriented along the longitudinal axis $L_L$—$L_L$ and radially extends from the outer edge 56 of the aperture 40 to the outer edge 58 of the distal end 42. A third channel 62 is oriented between the first channel 54 and the second channel 60, and the third channel 62 radially extends from the outer edge 56 of the aperture 40 to the outer edge 58 of the distal end 42. Because the first channel 54 is approximately perpendicularly oriented (e.g., 90°) to the longitudinal axis $L_L$—$L_L$, and because the second channel 60 is approximately oriented along the longitudinal axis $L_L$—$L_L$ (e.g., 0°), the third channel 62 is preferably oriented between about zero degrees (0°) and about ninety degrees (90°), more preferably between about fifteen degrees (15°) and about seventy five degrees (75°), and most preferably between about thirty degrees (30°) and about sixty degrees (60°).

The standard reposes within either channel. Each channel 54, 60, and 62 has a width sized to accept a thickness 64 of an end portion 66 of the standard 12. Each channel 54, 60, and 62 also has a depth sufficient to retain the end portion 66 within the channel. As the standard 12 pivots about the pivot axis $L_P$—$L_P$ (shown as reference numeral 52), the end portion 66 of the standard 12 falls into either channel 54, 60, or 62. Each channel 54, 60, or 62 thus retains the standard 12 in one of three positions: the first channel 54 retains the standard 12 in a position approximately perpendicular to the lower support member 32, the second channel 60 retains the standard 12 in a position approximately along the lower support member 32, and the third channel 62 retains the standard 12 in an intermediate position. These three channels 54, 60, and 62 allow the standard 12 to be oriented to improve visibility of the standard 12. If a user desires to change the orientation of the standard 12, the upper support member 30 and the lower support member 32 are spaced such that the standard 12 may be lifted out of the channel (either 54, 60, or 62) and pivoted to another channel. When the standard 12 is lifted from the channel (either 54, 60 or 62), the lower pin 48 preferably has a length sufficient to retain the lower pin 48 within the aperture 40 in the lower support member 32. When the standard 12 drops into either channel (54, 60, or 62), the upper pin 46, likewise, preferably has a length sufficient to retain the upper pin 46 in the aperture 36 in the upper support member 30. The standard 12 may thus be lifted from engagement with one channel (54, 60, or 62) and pivoted to engage another channel.

Not only do the channels 54, 60, and 62 orient the standard 12, but the channels also reduce damage. Although the channels have a depth sufficient to retain the end portion 66, the channels also provide a folding feature during impact. If a passing motorist impacts the standard 12, the force of the impact snaps the end portion 66 from the channel. The standard 12 is thus able to pivot about the pivot axis $L_P$—$L_P$ (shown as reference numeral 52). As the standard 12 pivots, impact energy is absorbed and damage is reduced.

Figure 4:
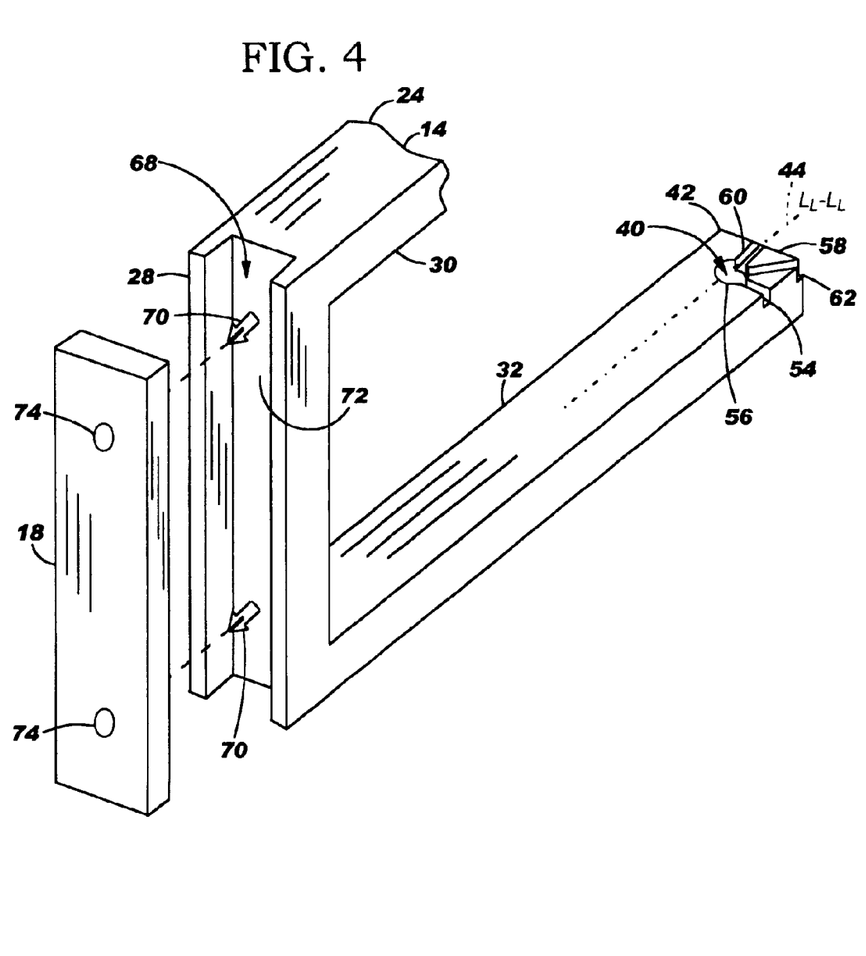
Figure 4A:
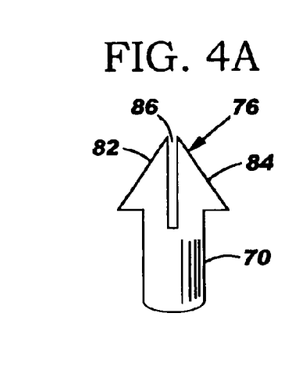

FIG. 4 is a schematic showing additional details of the mount 14 shown in FIG. 1. FIG. 4 is a partial, exploded view of the mount 14 and the permanent magnet 18. The body 28 has a channel 68 sized to accept the permanent magnet 18. The channel 68 is preferably sized such that the permanent magnet 18 frictionally engages, or "press fits" into, the channel 68. The channel 68, for example, may include one or more protruding posts 70 spaced along the channel 68. Each post 70 outwardly protrudes from a bottom surface 72 of the channel 68. Each post 70 inserts into and through a corresponding hole 74 in the permanent magnet 18. As FIG. 4A best shows, each post 70 has a cone-shaped top portion 76, a left finger halve 82, and a right finger halve 84. An open slot 86 separates the left finger halve 82 from the right finger halve 84. Because the conical top portion 76 has a major diameter greater than the corresponding hole 74, the finger halves 82 and 84 squeeze together as the cone-shaped top portion 76 inserts into and through the hole 74. When the cone-shaped top portion 76 emerges through the hole 74, the finger halves 82 and 84 expand and the conical top portion 76 retains the permanent magnet 18 in the channel 68.

The channel 68 alternatively or additionally may include a inwardly protruding lip or flange along at least one side of the channel 68. The permanent magnet 18 would insert into an open end of the channel 68 and slide along the channel 68. The flange helps retain the permanent magnet 18 in the channel 68. The channel 68 is preferably sized such that the permanent magnet 18 frictionally slides along the channel 68. The permanent magnet 18, however, may alternative or additionally be secured to the mount 14 using any other securement. Tabs, tangs, adhesives, threaded fasteners, welds, and/or any other means of securing the permanent magnet 18 are suitable.

Once the standard 12 is deployed, the standard 12 alerts others. If, for example, the standard 12 has a highly-visible surface color (shown as reference numeral 22 in FIG. 1), the standard 12 alerts a person to be aware while in the vicinity of the standard 12. When the mount 14 is magnetically attached to the vehicle (shown as reference numeral 20 in FIG. 1), the standard 12 alerts an approaching motorist, or pedestrian, to be aware while in the vicinity of the vehicle. The standard 12, however, could alternatively be produced with a logo or trademark to signify support or loyalty for a group, such as a sporting team. The standard 12 could be imprinted with a photograph, picture, icon, logo, trademark, cartoon character, scene, word, phrase, or number(s). The standard 12 could then be marketed to sporting/cultural/artistic fans or participants.

Figure 5:
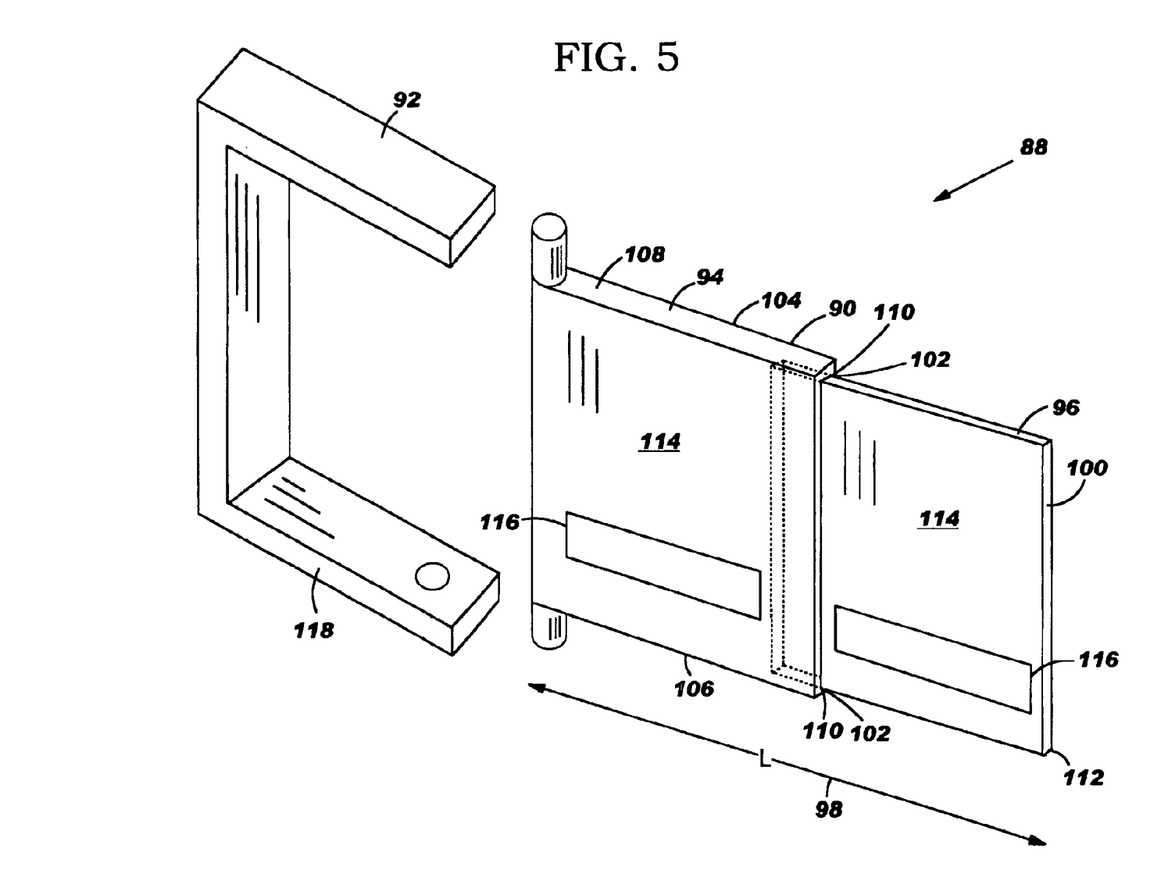
FIG. 5 is a schematic showing an alternative embodiment of this invention.

FIG. 5 is a schematic showing an alternative embodiment of this invention. FIG. 5 shows an extensible safety device 88. This safety device 88 comprises a rigid standard 90 extending from a mount 92. The standard 90, however, comprises at least a first section 94 moving in relation to a second section 96. The first section 94 moves to extend a length L (shown as reference numeral 98) of the standard 90. The standard 90 may even comprise more sections moving in relation to the first 94 and second 96 sections to further extend the length L of the standard 90. The term "moving" means at least one of the sections 94 and 96 slide, pull, translate, extend, screw, spin, thread, push, and/or raise to increase the length L of the standard 90.

FIG. 5, for example, shows the section 94 sliding to increase the length L of the standard 90. The first section 94 is a rigid panel 100 that slides along a track 102. The track 102 outwardly extends from a top 104 and a bottom 106 of the second section 94, the second section also being shown as a panel 108. The track 102 has a track channel 110 extending along at least a portion of the bottom 106 of the second panel 108. The track channel 110 preferably has a width slightly larger than a thickness of the first panel 100, thus allowing a bottom edge 112 of the first panel 100 to insert into, and slide along, the track channel 110. The extensible standard 90 may have as many sections, in any length, to suit the application. The panels 100 and 108, for example, may each have a length of about twelve inches (12 in.) and a height of eight inches (8 in.), thus providing almost twenty four inches (24 in.) of length L. The panels may have smaller dimensions or larger dimensions to suit the application. The standard 90 may also have more or less than the two panels shown.

FIG. 5 also shows additional details of the safety device 88. While the standard 90 is rigid, the standard 90 may be constructed of any polymer material and/or metal material that permits the extensible feature of the invention. The standard 90 preferably has a highly-visible surface color 114, and the standard 90 may include reflective material 116 to enhance visibility of the standard 90. The standard 90 may extend from the mount 92, and the mount 92 may include a permanent magnet (not shown). The standard 90 may be supported by at least one support member 118 extending from the mount 92 to the standard 90. The at least one support member 118 may have a swivel feature (not shown) at either end of the support member 118. This swiveling feature allows the support member 118 to swivel at the mount 92 and/or the standard 90, thus permitting the standard 90 to be oriented for visibility.

Figure 6:
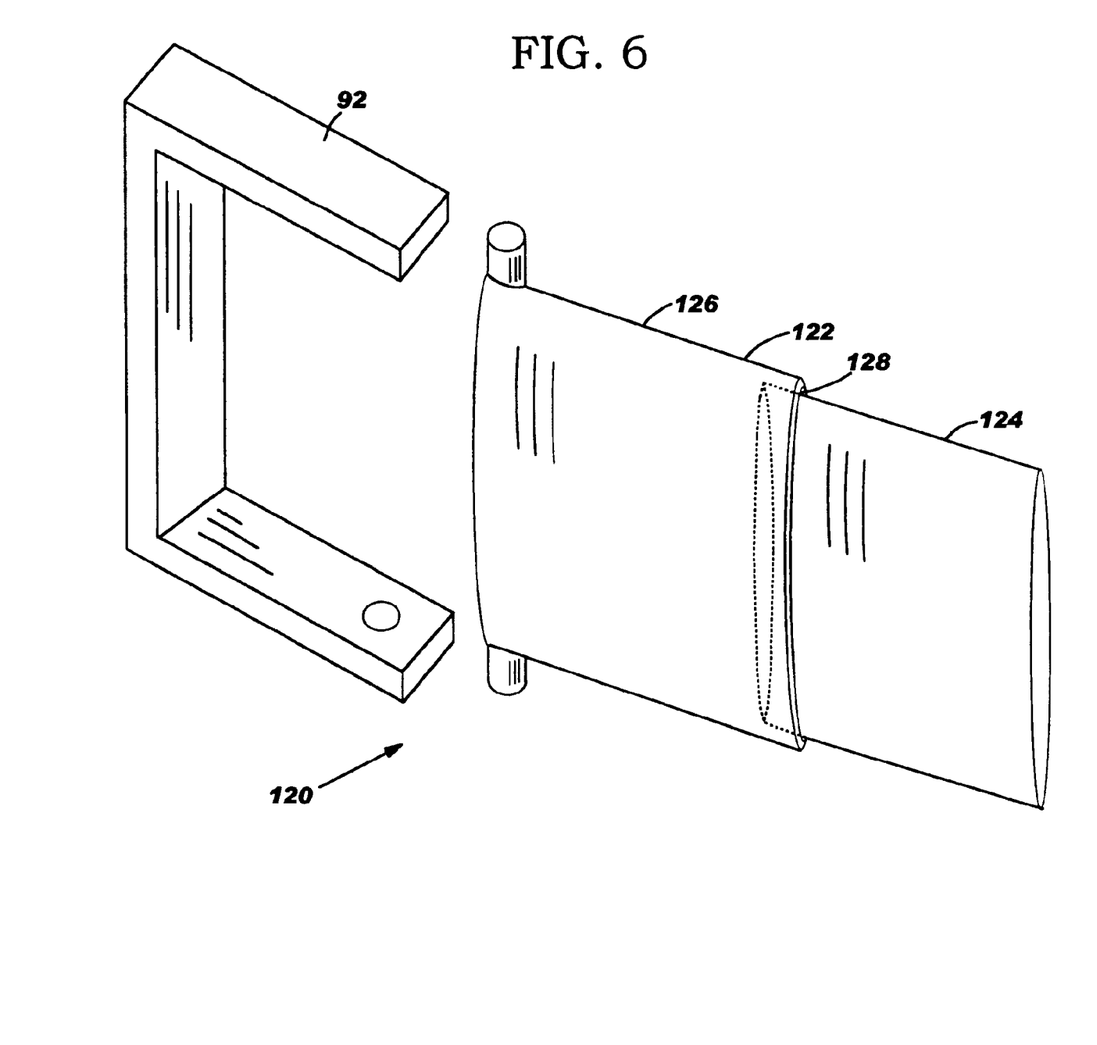
FIG. 6 is a schematic showing yet another alternative embodiment of this invention.

FIG. 6 is a schematic showing yet another alternative embodiment of this invention. FIG. 6 shows a telescopic safety device 120 to enhance visibility. This safety device 120 comprises a rigid standard 122 extending from the mount 92. Here the standard 122 has an inner section 124 and an outer section 126. The outer section 126 has a tubular cross-section 128, and the inner section 124 is sized such that the inner section 124 slides within the outer section 126. Although only one inner 124 and outer 126 section is shown, the telescoping standard 122 may have successive pairs of inner and outer sections. The successive pairs of inner and outer sections are sized such that an inner section of one pair is also the outer section of an adjoining pair (e.g., similar to a telescopic antenna).

While the standard 122 is rigid, the standard 122 may be constructed of any polymer material and/or metal material that permits the extensible feature of the invention. The standard 122 preferably has the highly-visible surface color (such as that shown as reference numeral 22 in FIG. 1), and the standard 122 may include reflective material to enhance visibility of the standard 122. The standard 122 may extend from the mount 92, and the mount 92 may include a permanent magnet. The mount 92 may include the swivel feature allowing the standard 122 to be oriented for visibility. FIG. 6 shows the telescopic standard 122 having an oval tubular cross-section, however, any tubular cross-section is suitable for this invention.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:
1. A safety device, comprising:
   a rigid standard extending from, and pivoting about, a magnetic mount,
   the mount comprising a generally "C"-shaped bracket having an upper support member spaced from a lower support member, the upper support member having an elongate shape defining an upper longitudinal axis, the lower support member also having an elongate shape defining a lower longitudinal axis, the upper support member and the lower support member each extending from a body of the "C"-shaped bracket, the upper support member and the lower support member each having an aperture at a distal end thereof, the mount also comprising a permanent magnet;

the standard having an upper pin and a lower pin at a common end of the standard, the upper pin and the lower pin aligned along a pivot axis, the upper pin inserting into the aperture in the upper support member, while the lower pin inserts into the aperture in the lower support member, the upper pin and the lower pin each rotating within their respective apertures to allow the standard to pivot about the pivot axis;

the lower support member also comprising a first channel, a second channel, and a third channel, the first channel approximately perpendicularly oriented to the lower longitudinal axis and radially extending from an outer edge of the aperture to an outer edge of the distal end, the second channel approximately oriented along the longitudinal axis and radially extending from the outer edge of the aperture to the outer edge of the distal end, and the third channel oriented between the first channel and the second channel and radially extending from the outer edge of the aperture to the outer edge of the distal end;

the first, second, and third channels each having a width sized to accept a thickness of the standard, and the first, second, and third channels each having a depth sufficient to retain a portion of the standard within the channel, wherein as the standard pivots about the pivot axis, the standard falls into either the first, second, or third channel, thus orienting the standard along the respective channel.

2. A safety device according to claim 1, wherein the standard has a highly-visible surface color.

3. A safety device according to claim 1, wherein the standard comprises reflective material to enhance visibility of the standard.

* * * * *